June 29, 1937.   Z. V. WEISEL   2,085,520
PLOW BOTTOM AND RENEWABLE CUTTING EDGE THEREFOR
Filed Sept. 4, 1936   2 Sheets-Sheet 1
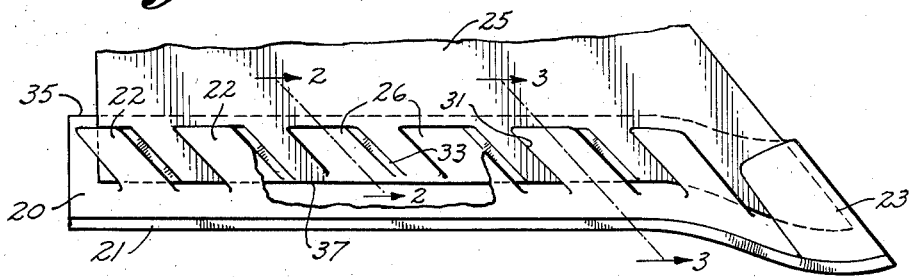
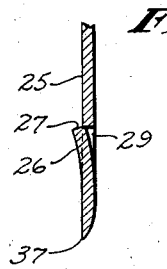
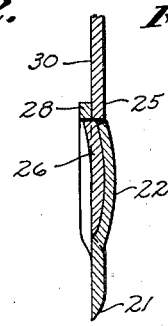
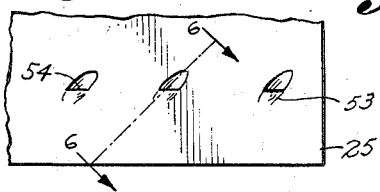
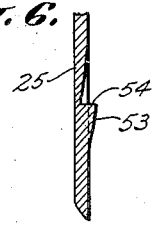
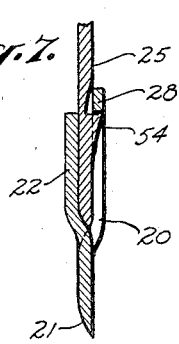
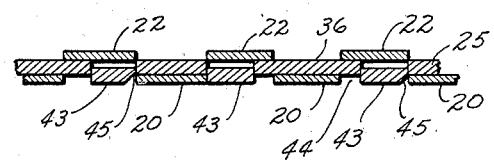
INVENTOR.
Zenas V. Weisel;
BY Russell M. Otis
ATTORNEY.

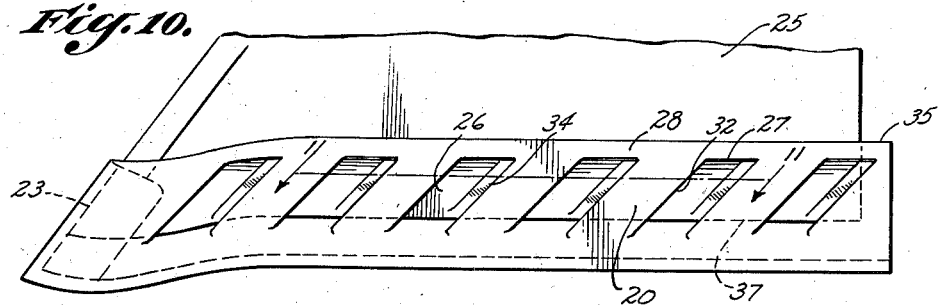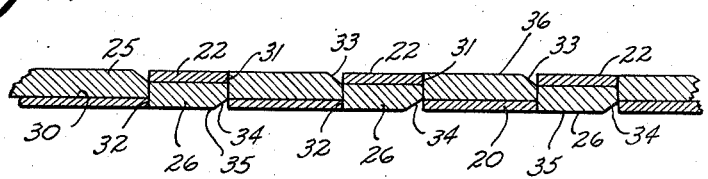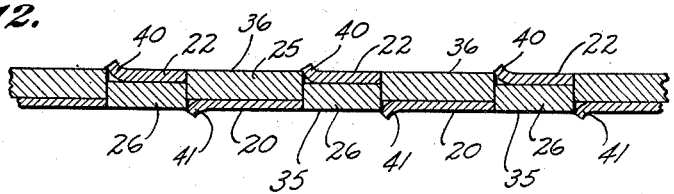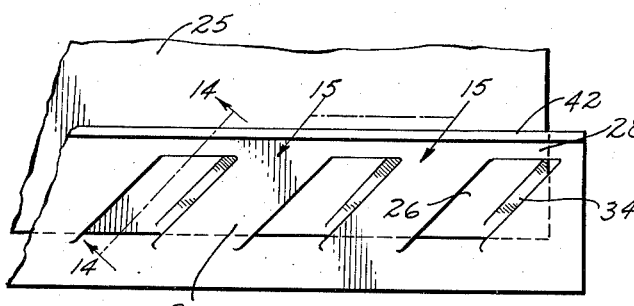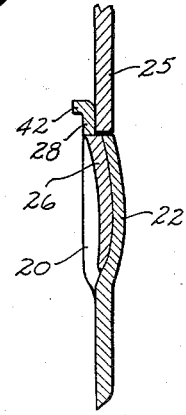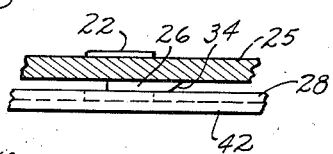

Patented June 29, 1937

2,085,520

UNITED STATES PATENT OFFICE 2,085,520

PLOW BOTTOM AND RENEWABLE CUTTING EDGE THEREFOR

Zenas V. Weisel, Los Angeles, Calif., assignor to Universal Plow Edge Company, Ltd., Los Angeles, Calif., a corporation of California Application September 4, 1936, Serial No. 99,429

16 Claims. (Cl. 97—125)

My invention relates to plow bottoms and like earth working implements and renewable cutting edges therefore.

Renewable cutting edges are known to be employed on common plowshares and to be retained thereon by the frictional gripping action of a series of fingers located on the renewable cutting edge member. Such renewable cutting edges have the advantage that the user need not resharpen his plowshare, he simply throws away the worn edge and installs a new one in its place. An example of such an edge is that shown in the patent issued to George M. Reynolds, No. 2,016,578, Oct. 8, 1935. Edges of this general type which are retained on a plowshare by a frictional action have the great advantage over other constructions now in use that no bolts or screws need be employed in retaining the edge in its operative position. But this advantage is accompanied also by a corresponding disadvantage in that the renewable cutting edge may be removed by a force accidentally encountered in the operation of the device.

It is an object of my invention to provide a plow bottom having means for retaining thereon a renewable cutting edge, which plow bottom automatically catches and holds the edge when the edge is forced into operative position on the plow bottom.

It is another object of the invention to provide a plow bottom and a renewable cutting edge therefor in which the edge is automatically caught and held by the plow bottom as the edge is forced thereon into operative position, and in which the edge is of such construction that it may, where desired, be employed on common plowshares and be held thereon by frictional contact.

Another object of the invention is to provide a plow bottom and a renewable cutting edge therefor in which the edge is caught and held by the plow bottom as the edge is forced thereon into operative position and which include means on either or both of the plow bottom and renewable cutting edge for aiding in deliberately removing the cutting edge member from the plow bottom.

Still another object of my invention is to provide a renewable cutting edge of superior strength which particularly adapts itself for use with the plow bottoms of my invention and which can be conveniently removed therefrom.

Other objects and advantages will be apparent from consideration of the following description taken in connection with the accompanying drawings, of which:

Fig. 1 is a view of a renewable cutting edge installed on a plow bottom with a portion of the cutting edge member cut away to show the construction of the plow bottom. The view is taken from the upper side of the plow bottom.

Fig. 2 is a sectional view of the plow bottom of Fig. 1 taken along the line 2—2 in the direction shown.

Fig. 3 is a sectional view of the plow bottom and cutting edge member of Fig. 1 taken along the line 3—3 in the direction shown.

Fig. 4 is a sectional view, corresponding to Fig. 3, of an alternative form of renewable cutting edge installed on an alternative form of plow bottom.

Fig. 5 is a view of the under face of an alternative form of plow bottom.

Fig. 6 is a sectional view of the plow bottom of Fig. 5 taken along the line 6—6.

Fig. 7 is a sectional view of a renewable cutting edge installed on the plow bottom of Figs. 5 and 6.

Fig. 8 is a sectional view of an alternative form of plow bottom.

Fig. 9 is a partial sectional view of an alternative form of plow bottom with a renewable cutting edge installed thereon.

Fig. 10 is a view of a renewable cutting edge installed on the plow bottom of Fig. 1, the view being taken from the under side of the plow bottom.

Fig. 11 is a partial sectional view of the plow bottom and renewable cutting edge of Fig. 10 taken along the line 11—11 in the direction shown.

Fig. 12 is a partial sectional view, corresponding to Fig. 11 of a plow bottom having installed thereon an alternative form of renewable cutting edge.

Fig. 13 is a view of a plow bottom having installed thereon an alternative form of renewable cutting edge, the view being taken from the under side of the plow bottom.

Fig. 14 is a sectional view of the plow bottom and renewable cutting edge of Fig. 13 taken along the line 14—14.

Fig. 15 is a partial sectional view of the plow bottom and renewable cutting edge of Fig. 13 taken along the line 15—15 showing the renewable cutting edge being removed from the plow bottom.

The renewable cutting edge employed to illustrate the invention in Fig. 1 is of the same type as that disclosed in the Reynolds patent abovementioned. It consists of a longitudinally extending strip 20 provided with a cutting edge 21, and from which fingers 22 are punched out, the fingers and the part from which they were punched being spread apart to provide a space therebetween for reception of a plowshare or plow bottom. At the forward end or point the strip 20 is bent around and made to lie against itself adjacent the cutting edge to provide a socket 23 for reception of the point of the plowshare or plow bottom and to form an abutment for the landside of the implement to be received therein.

Ordinarily a renewable cutting edge of this type is installed on an ordinary plowshare by forcing it over the cutting edge of the share with the fingers engaging one face of the share and the opposing part of the renewable edge engaging the other face of the plowshare, the point of the plowshare being located in the socket at the forward end of the renewable edge. Under these circumstances the edge is held on the share by reason of the frictional engagement of the various parts with the share.

By this invention I provide a specially designed plow bottom for cooperation with a renewable cutting edge; and while this plow bottom may be made of suitable steel and be so formed at its edge as to serve as a plowshare, my invention permits of a great saving in cost by not requiring these characteristics in a plow bottom. The plow bottom of my invention need not have a cutting edge formed thereon and need not be of high quality steel such as is used in making shares to resist the abrasion to which the cutting edge is subjected. My plow bottom may, therefore, be in the form of a cheap casting if desired. My plow bottom does not depend upon friction to retain the renewable cutting edge thereon but is designed to positively lock the renewable edge in operative position on the plow bottom in such manner that the edge can only be removed by acting upon it deliberately with that intent.

In the form of the invention illustrated in Figs. 1, 2, 3, 10, and 11, I provide a plow bottom 25 having the same general contour as a plowshare. This plow bottom has punched out therefrom at intervals along its lower edge a series of projecting tongues 26 which are forced down to project beyond the under face of the plow bottom. The tongues 26 remain connected to the body of the plow bottom at their lower ends, while their upper ends form shoulders 27 directed away from the longitudinal edge 37 and against which shoulders the uppermost bar portion 28 of the renewable cutting edge is retained. The tongues 26 are of substantially the same width as the fingers 22 of the renewable edge and are preferably so located along the plow bottom that when the renewable edge is installed in operative position on the plow bottom each finger 22 rests in the depression 29 left by punching down one of the tongues 26, and each of the tongues 26 forms a projection extending into the opening in strip 20 left by punching out one of the fingers 22. It will be seen that as the edge is forced on over the edge 37 of the plow bottom 25 the uppermost bar portion 28 of the renewable edge rides up the tongues 26 and finally, when operative position is reached, snaps over the shoulders 27 and up against the under face 30 of the plow bottom. At the same time the point of the plow bottom comes to rest snugly in the point socket 23 of the renewable edge.

In the operative position illustrated, then, it will be obvious that the renewable cutting edge member is locked on the plow bottom against forces transverse to the edge by reason of the engagement of the bar portion 28 of the renewable edge with the shoulders 27 of the tongues 26. The renewable edge is prevented from backwardly directed longitudinal movement by the abutment of the landside of the plow bottom against the side of the point socket 23 and also by engagement of the sides of the fingers 22 with the sides 31 of the spaces in which they rest and by engagement of the sides of tongues 26 with the sides 32 of the openings in which they rest. Indeed the locking is so complete that if it were not for special provision it would be difficult to remove the renewable edge from the associated plow bottom when it is desired to remove it.

The means specially provided to facilitate deliberate removal of the renewable edge from the plow bottom preferably takes the form of sloping edges or ramps 33 on the edges of plow bottom 25 defining the forward boundaries of the depressions into which the fingers 22 fit, and also sloping edges or ramps 34 on the rear sides of the tongues 26. These sloping edges all slope forward toward the point of the implement and outward toward the adjacent faces of the respective parts. To deliberately remove the renewable edge from the plow bottom, the renewable edge is struck a blow to force it toward the point of the implement. To facilitate this operation it is preferable to have the renewable edge somewhat longer than its associated plow bottom so that it overhangs at the rear at 35. As the edge member is forced longitudinally forward with respect to the plow bottom the fingers 22 ride up the ramps 33 and are thereby spread outwardly until they rest on the upper face 36 of the plow bottom. At the same time those portions of the strip 20 which lie between the tongues 26 ride up the ramps 34 and are thereby spread outwardly until they rest on the under faces 35 of the tongues 26. When in this position, the bar portion 28 of the renewable edge is spread outward beyond the shoulder 27 and there is nothing except friction to prevent removal of the edge from the plow bottom. The rear end 35 of the renewable edge is then struck a transverse blow so as to force the renewable edge off the plow bottom in a direction perpendicular to the cutting edge. Thus, the renewable edge may conveniently be removed from the plow bottom, but only by a sequence of operations which could practically never be encountered accidentally in practice.

An alternative means for facilitating deliberate removal of the renewable edge is that illustrated in Fig. 12. In this form, the forward sides of the fingers 22 at 40 are bent outward so that the inner surfaces of the fingers stand above the surface 36 of the plow bottom. Likewise, the forward sides of those portions of the strip 20 lying between the tongues 26 are bent outward at 41 so that the inner surfaces of those portions stand above the surfaces 35 of the tongues 26. The same sequence of operations, as described above, is employed to remove this renewable edge from the plow bottom. The renewable edge is first forced forward longitudinally whereupon the parts of the renewable edge are spread apart by reason of the engagement of the cam surfaces at 40 and 41 with the adjacent edges of the plow bottom and of the tongues 26. When these parts of the renewable edge rest on surfaces 35 and 36, the edge is forced off by blows directed perpendicular to the cutting edge.

In the case of either of the forms shown in Figs. 11 and 12, if the bar portion 28 of the renewable edge bends during the longitudinal movement which is effected to remove the edge, the entire length of the portion 28 residing above the shoulder 27 may not be spread outward sufficiently far to clear the shoulder 27 when it is attempted to force the edge off by a blow perpendicular to the cutting edge. The tendency of the portion 28 to so bend is greater when the tongues 26 are far apart or when only one is employed, as may well be done. To obviate this difficulty I prefer to form on the bar portion 28 of the renewable cutting edge member a transversely extending rib 42 which is here shown as being formed by bending at right angles the termination of portion 28. The rib 42 provides strength sufficient to insure that as soon as any part of the portion 28 is spread far enough to clear the shoulder 27 all parts thereof will also clear it, as shown in Fig. 15, and the renewable edge can be removed with no inconvenience.

I may employ with the renewable edges above described a form of plow bottom illustrated in Fig. 9. In this form, there are one or more tongues 43 punched downward out of the plow bottom 25 in a manner similar to that of the forms previously described, except that the tongues 43 are not as wide as the fingers 22 of the renewable edge and therefore do not fill the space 44 left by punching out the fingers 22. For the same reason, the space left by punching down the tongues 43 is not wide enough to accommodate the fingers 22; so these fingers of the renewable edge rest on the face 36 of the plow bottom and cover the spaces left by punching down the tongues 43. In order to better lock the renewable edge from longitudinal movement on the plow bottom, the tongues 43 are so located that they alternately engage the strip 20 at opposite sides of the openings in strip 20 in which they reside. Thus the strip 20 cannot move either way without engaging one or another of the tongues 43. To facilitate deliberate removal of the renewable cutting edge, all of the tongues 43 which engage the strip 20 at their rear sides are formed at those points with ramps 45. The renewable edge is locked on this plow bottom by engagement of its uppermost bar portion 28 with the shoulders formed by the tops of the tongues 43 and removal from the locked position is effected by the same sequence of operations as previously described in connection with the plow bottom of Fig. 1.

Instead of tongues formed by punching clear through the plow bottom, I may provide a locking projection in the form illustrated in Fig. 8. Here, the projections 50 are formed on one face of the plow bottom providing shoulders 51 for engagement by the bar portion 28 of the renewable edge opposite the fingers 22. On the opposite face of the plow bottom are formed depressions 52 which may be of such size and so located as to allow the fingers 22 to rest therein, as in the form disclosed in Figs. 1 and 2. The projections 50 and depressions 52 may be formed by a forging operation or the plow bottom may be cast in that shape. The projections 50 and depressions 52 may have ramps on their sides similar to those illustrated in Fig. 11 to facilitate deliberate removal of the edge from the plow bottom.

An alternative form of projection for locking engagement with the renewable edge is as shown in Figs. 5, 6, and 7. By means of an indenting tool, the metal of the plow bottom is forced down and out to form projections 53 providing shoulders 54 for engagement by the uppermost bar portion of the renewable edge opposite the fingers 22. Since the projections 53 unite in a smooth curve with the body of the plow bottom, they act as ramp surfaces and permit removal of the renewable edge by the same sequence of operations as previously described for the plow bottom of Fig. 1.

An alternative form of plow bottom and associated renewable cutting edge is shown in Fig. 4. Tongues 55 are punched up from the plow bottom and project above the upper face thereof, leaving a space 56 behind into which sections of the bar portion 28 of the renewable cutting edge rest. The tongues 55 are located to be opposite the fingers 22 of the associated renewable cutting edge so that the fingers 22 and the tongues 55 abut to form a smooth face surface. The renewable cutting edge employed with this plow bottom is similar to those previously described except that opposite the fingers 22 the bar portion 28 is depressed inwardly toward the fingers to provide sections 57 which have locking engagement with the shoulders 58 at the bottom of depressions 56. To remove the renewable cutting edge from the plow bottom, the same sequence of operations described in connection with the form shown in Fig. 1 is resorted to. Since the locking section 57 unites in a smooth curve with the remainder of portion 28, when the renewable edge is forced forward longitudinally on the plow bottom the section 57 will ride out of depression 56 and up onto the flat surface of the plow bottom, and in this position the edge may be removed from the plow bottom by forcing it off in a direction perpendicular to the cutting edge.

It is understood that many changes and modifications in design and construction may be made by those skilled in the art. The renewable cutting edge may have only a single gripping finger instead of a plurality as shown; or it may have a continuous strip to engage one face of the plow bottom while that portion which engages the opposite face has openings to accommodate the locking projections on the plow bottom. If desired, the renewable edge may be reversed with respect to the parts engaging the upper and under faces of the plow bottom and the plow bottom may be correspondingly reversed to make the locking occur on the upper instead of the under face of the plow bottom. The locking tongues and projections on the plow bottom may be formed in numerous shapes and by other methods as, for example, by welding or riveting them to the plow bottom. These and other changes and modifications may be made without departing from the spirit of the invention as defined in the appended claims.

I claim:

1. In combination, a plow bottom, and a renewable cutting edge therefor including portions frictionally engaging both faces of said plow bottom, one of said portions having an opening therein, said plow bottom having a projection extending into said opening in locking engagement with the adjacent portion of said renewable cutting edge.

2. In combination, a plow bottom, and a renewable cutting edge therefor including a strip adapted to engage one face of the plow bottom and having openings therein, and means on said renewable edge adapted to engage the opposite face of said plow bottom, said plow bottom having projections extending into said openings whereby the portion of said strip above said openings has locking engagement with said projections to retain said renewable edge on the plow bottom.

3. In combination, a plow bottom, and a renewable cutting edge therefor including a longitudinally extending strip having fingers punched out therefrom, and providing openings in said strip, said plow bottom being received between said fingers and said strip and having projections extending into said openings to lock said renewable edge in position.

4. In combination, a plow bottom, and a renewable cutting edge therefor including a longitudinally extending strip having fingers punched out therefrom providing openings in said strip and a bar portion above said openings, said plow bottom being received between said fingers and said strip and having depressions formed on the face adjacent said fingers for reception of the fingers and having projections on the opposite face extending into said openings and cooperating with said bar portion to lock said renewable edge on the plow bottom.

5. In combination, a plow bottom, and a renewable cutting edge therefor including a longitudinally extending strip having fingers punched out therefrom providing openings in said strip and a bar portion above said openings, said plow bottom being received between said fingers and said strip and having tongues punched out so as to extend into said openings to provide with said bar portion a lock for retention of the renewable edge on the plow bottom.

6. In combination, a plow bottom, and a renewable cutting edge therefor including a longitudinally extending strip having fingers punched out therefrom providing openings in said strip and a bar portion above said openings, said plow bottom being received between said fingers and said strip and having tongues punched out so as to extend into said openings to provide with said bar portion a lock for retention of the renewable edge on the plow bottom, said fingers residing in depressions left in the plow bottom by the punching out of said tongues.

7. In combination, a plow bottom, and a renewable cutting edge therefor including a longitudinally extending strip having fingers punched out therefrom and providing openings in said strip, said plow bottom being received between said fingers and said strip and having projections extending into said openings for retention of said renewable edge, and means acting upon forward longitudinal movement of the renewable cutting edge with respect to the plow bottom to separate said strip from the face of said plow bottom to the extent that said projections no longer extend into said openings.

8. In combination, a plow bottom, and a renewable cutting edge therefor including a longitudinally extending strip having fingers punched out therefrom providing openings in said strip and a bar portion above said openings, said plow bottom being received between said fingers and said strip and having tongues punched out so as to extend into said openings to provide with said bar portion a lock for retention of the renewable edge on the plow bottom, said fingers residing in depressions left in the plow bottom by the punching out of said tongues, and ramps on the rear edges of said tongues adjacent said strip and on the edges of said plow bottom adjacent the forward edges of said fingers whereby forward longitudinal movement of the renewable cutting edge with respect to the plow bottom results in spreading said bar portion out of possible locking engagement with said tongues.

9. In combination, a plow bottom, and a renewable cutting edge therefor including a longitudinally extending strip having fingers punched out therefrom providing openings in said strip and a bar portion above said openings having a transversely extending reinforcing rib, said plow bottom being received between said fingers and said strip and having depressions formed on the face adjacent said fingers for reception of the fingers and having projections on the opposite face extending into said openings and cooperating with said bar portion to lock said renewable edge on the plow bottom, there being ramps on the rear edges of said projections adjacent said strip and on the edges of said plow bottom adjacent the forward edges of said fingers whereby forward longitudinal movement of the renewable cutting edge with respect to the plow bottom results in spreading said bar portion out of possible locking engagement with said projections.

10. A renewable cutting edge member including a longitudinally extending strip having fingers punched out and spaced therefrom providing openings in the strip, and a bar portion above said openings having a transversely extending reinforcing rib.

11. A plow bottom having a longitudinally extending edge for reception of a renewable cutting edge member thereon, and a projection extending from one of the faces of said plow bottom and presenting a shoulder directed away from said edge for locking engagement by a portion of the renewable cutting edge member.

12. A plow bottom having a longitudinally extending edge for reception of a renewable cutting edge member thereon, and having a depression in one face thereof, and a projection projecting from the other face of the plow bottom opposite said depression and presenting a shoulder directed away from said edge for locking engagement by a portion of the renewable cutting edge member.

13. A plow bottom having a longitudinally extending edge for reception of a renewable cutting edge member thereon, and having a tongue punched out therefrom providing a shoulder directed away from said edge for locking engagement by a portion of the renewable cutting edge member.

14. A plow bottom having a longitudinally extending edge for reception of a renewable cutting edge member thereon, and having a plurality of tongues punched out therefrom which present shoulders directed away from said edge for locking engagement by portions of said renewable cutting edge member.

15. A plow bottom having a longitudinally extending edge for reception of a renewable cutting edge member thereon, and a projection extending from one of the faces of said plow bottom and presenting a shoulder directed away from said edge for locking engagement by a portion of said renewable cutting edge, said projection having a ramp on its rear edge.

16. A plow bottom having a longitudinally extending edge for reception of a renewable cutting edge member thereon, and having a depression in one face thereof, and a projection projecting from the other face of the plow bottom opposite said depression and presenting a shoulder directed away from said edge for locking engagement by a portion of the renewable cutting edge member, there being a ramp on the rear edge of said projection and a ramp on the edge of the plow bottom defining the forward boundary of the depression.

ZENAS V. WEISEL.